Feb. 24, 1970     YOU MIN CHEN     3,497,691
DUAL MODE FLUORESCENCE AND BACKSCATTER COATING
THICKNESS MEASURING GAUGE
Filed June 30, 1967     2 Sheets-Sheet 1

INVENTOR.
You Min Chen
BY Wood, Herron & Evans
ATTORNEYS

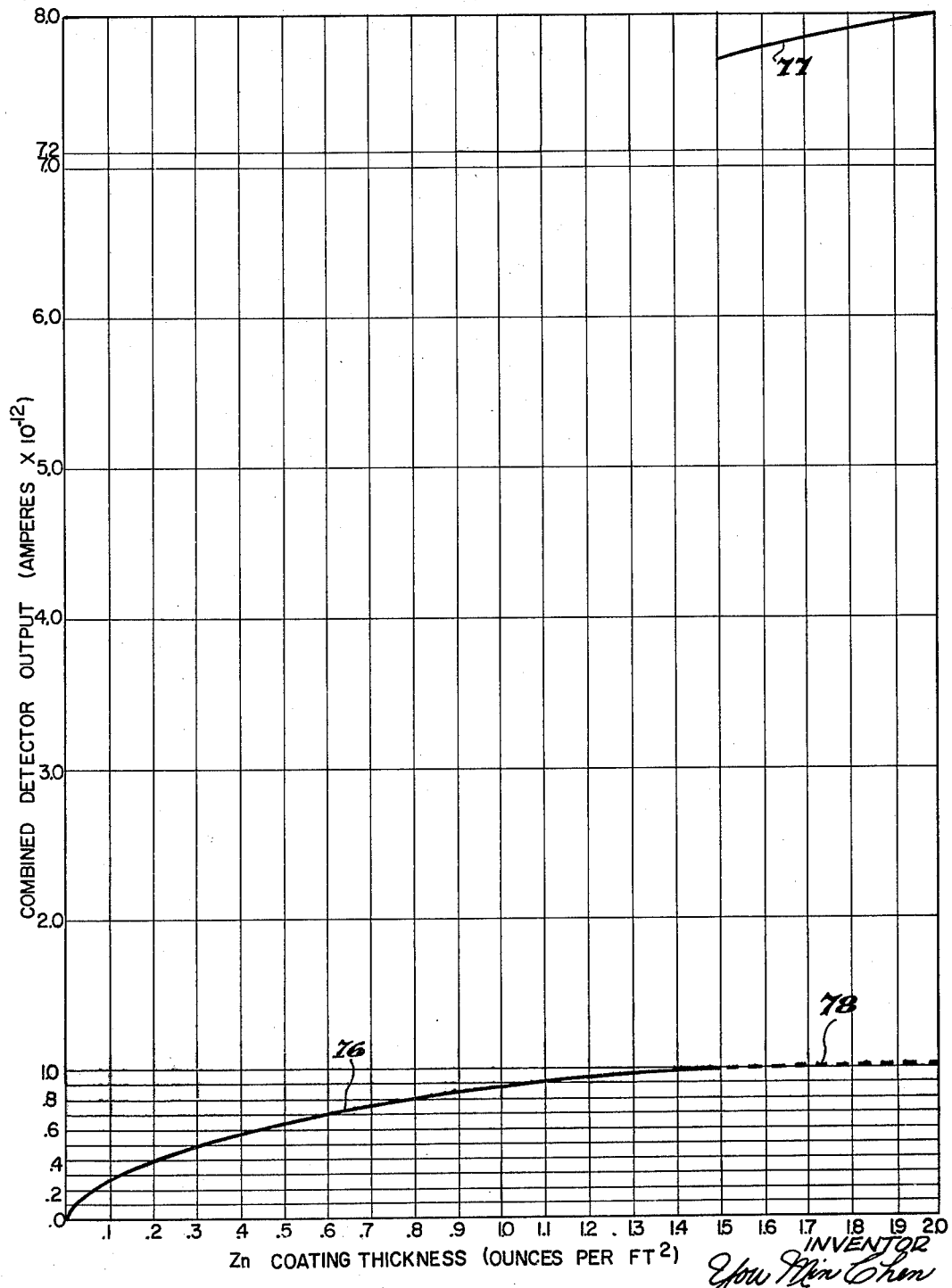

United States Patent Office 3,497,691
Patented Feb. 24, 1970

3,497,691
DUAL MODE FLUORESCENCE AND BACK-SCATTER COATING THICKNESS MEASURING GAUGE
You Min Chen, Cincinnati, Ohio, assignor to The Ohmart Corporation, Cincinnati, Ohio, a corporation of Ohio
Filed June 30, 1967, Ser. No. 650,334
Int. Cl. G01t 1/16
U.S. Cl. 250—83.3                        8 Claims

ABSTRACT OF THE DISCLOSURE

A gauge is disclosed for measuring, over a wide range, the thickness of a coating formed on a base material. The gauge includes a source of radiation for exciting the coating and base material, causing both to fluoresce, and for producing back-scattered radiation; a pair of detectors which have response characteristics including both fluorescent emission and the back-scattered radiation; and a filter opaque to the fluorescent emission of the coating material. Also provided is a controller for shifting the filter into an operative position with respect to one of the detectors and for subtracting the detector outputs when it is desired to measure thicknesses below a predetermined level, and for shifting the filter into an inoperative position and adding the detector outputs when it is desired to measure thicknesses above the predetermined level. The effect of the controller is to shift the mode of operation of the gauge between a fluorescence mode accurate below the predetermined level and a back-scatter mode acurate above the predetermined level, thereby providing a gauge having combined operational characteristics which afford acuracy over an extended range.

---

Figure 1:
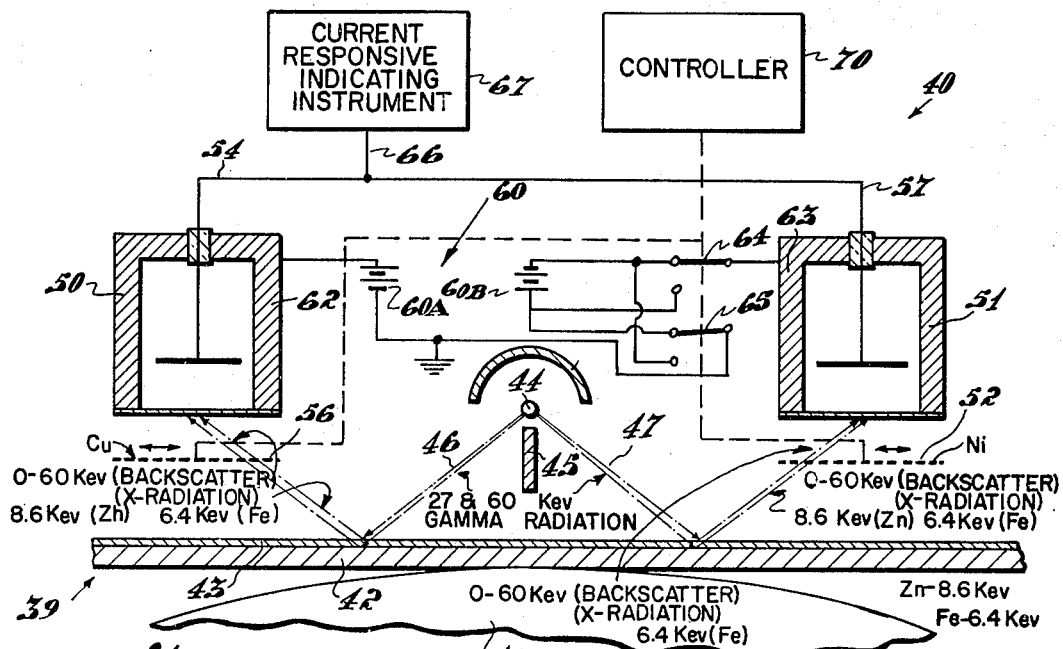

This invention relates to apparatus for measuring the thickness of coatings or layers formed on a base material and, more specifically, to apparatus for measuring coating thickness which is capable of providing accurate measurements over an extended range of thicknesses.

The apparatus of this invention is suitable for use in measuring the thickness of a variety of different types of material coatings. However, because this invention possesses an unusually high degree of utility in one particular measuring environment, the following structural and operational description is made with reference to one specific application, namely, the measurement of coatings or layers of zinc formed on ferrous base materials.

In a typical zinc coating operation, ferrous base material formed in a continuous sheet and moving at rates up to 300 feet per minute travels down a production line through various treating stations, ultimately passing through a coating stage where a layer of zinc is formed on the ferrous base material. Following this step the zinc coating ferrous base material travels to a rolling station where the sheet material, which usually has a width ranging between 48 inches to 72 inches, is formed into rolls for storage and eventual shipment.

One of the essential requirements of any zinc coating process is that the thickness of the zinc layer have a uniform value throughout the entire sheet or roll. In the zinc coating industry thickness is defined in terms of ounces of zinc per square foot of base material, and typically ranges from a mere fraction of an ounce per square foot to over two ounces per square foot. Due to inherent and uncontrolled variations in process parameters of a typical zinc coating operation, the thickness of the zinc coating which is formed has a tendency to drift from the desired value, causing nonuniformity coated stock to be produced.

To overcome the effects of process drift, and to assure the production of uniform thickness zinc coatings, it has been proposed to continuously measure the thickness of the coating as the coated stock proceeds down the production line. These measurements, in accordance with this proposal, are then input to a closed loop feedback system where an error signal is developed for the purpose of introducing variations in the coating process as are necessary to apply corrective action for returning the coating thickness to the desired value.

In designing apparatus for monitoring the thickness of a zinc coating, an essential requirement is that the apparatus be capable of providing accurate measurements over a large range of thicknesses. This permits the apparatus to be used in a production line where the thickness of the coating may vary by a substantial factor from one day to another as different production runs are made. If the measuring apparatus is useful over only a limited range of thicknesses, it is necessary to have an assortment of such limited range equipment in order to be able to measure throughout each of the various ranges. This requires a larger capital investment as well as added equipment maintenance expense. In addition, it necessitates changing and recalibrating the measuring equipment when the thickness of a new run falls without the operation range of the measuring apparatus used in the previous run. Such increased capital and operating expenses are obviously undesirable.

It has been a principal objective of this invention to provide coating thickness measuring apparatus capable of measuring, over an extended range and with a high degree of reliability and resolution, the thickness of coatings formed on base materials, such as zinc coatings formed on ferrous bases. This objective has been accomplished in accordance with the principles of this invention by utilizing a very novel and ingenious concept in the design of a thickness gauge. More specifically, this concept involves the provision of a nuclear gauge whose operational mode is very simply and easily switched between fluorescence, which is uniquely adapted for measuring coating thicknesses in one range, and backscatter, which is uniquely adapted for measuring coating thicknesses in a different range, thereby providing a gauge having composite operational characteristics which render it useful over a total range of thicknesses which is quite wide.

In one preferred form of this invention, wide range measuring apparatus is provided which continuously measures the thickness of a zinc coating as the coated ferrous sheet material passes beneath a nuclear gauge positioned directly over a feed roll in the production line. The nuclear gauge includes a source of radiation oriented and having an intensity such that it irradiates and penetrates both the zinc coating and the ferrous base material upon which the coating is formed, exciting the K alpha lines of both the zinc and ferrous material, in turn causing them to fluoresce and emit at their respective characteristic energy levels of 8.6 kev. and 6.4 kev. In addition to the characteristic fluorescent emission, the radiation source also produces X-radiation having randomly distributed energies backscattered from both the zinc coating and ferrous base which ranges from approximately 0 kev. to the maximum energy level of the radiation source.

The nuclear measuring head of this invention is also provided with a pair of radiation detectors each of which has a response characteristics which includes the characteristic fluorescent emission of the zinc coating and ferrous base of 8.6 kev. and 6.4 kev., respectively, as well as the backscattered X-radiation. In addition, one of the detectors is provided with a selectively operable filter which in its operative or filtering position blocks transmission to its associated detector of the characteristic fluorescent emission of the zinc coating of 8.6 kev.

With the filter in its inoperative or nonfiltering position, both detectors respond to the ferrous and zinc characteristic fluorescent emissions of 6.4 kev. and 8.6 kev., respectively, as well as the backscattered X-rays, providing identical and relatively large outputs having components correlated to the intensities of the zinc fluorescent emission of 8.6 kev., the ferrous fluorescent emission of 6.4 kev. and the backscattered X-radiation. However, with the filter in its operative or filtering position the filtered detector is responsive to only the characteristic fluorescent ferrous emission of 6.4 kev. and the backscattered X-radiation, and hence, provides an output which, with respect to output of the nonfiltered detector, is lower by an amount correlated to the intensity of the characterfluorescent emission of the zinc coating of 8.6 kev.

The measuring gauge of this invention is also provided with a controller for shifting the filter into its inoperative or nonfiltering position and adding the detector outputs when it is desired to measure coating thicknesses in excess of 1.5 ounces per square foot, and for shifting the filter into its operative or filtering position and subtracting the detector outputs when it is desired to measure coating thicknesses of less than 1.5 ounces per square foot. The controller, while only shifting the position of the filter and reversing the algebraic manipulation of the detector outputs, is effective to change the entire mode of operation of the gauge, namely, between a fluorescence mode and a backscatter mode. The fluorescence mode is peculiarly adapted to provide very accurate results for zinc thicknesses below 1.5 ounces per square foot, while the backscatter mode is uniquely adapted to provide accurate measurements for thicknesses exceeding 1.5 ounces per square foot.

In operation, when the filter is in its filtering position and the detector outputs subtracted, the gauge of this invention operates in a fluorescence mode. Specifically, the output of the filtered detector, which is correlated to the intensity of the backscattered X-radiation and the characteristic 6.4 kev. fluorescent emission of the ferrous base material, is subtracted from the output of the nonfiltered detector, which is correlated to the intensity of the characteristic fluorescent zinc and ferrous emissions of 8.6 kev., and 6.4 kev., respectively, and backscattered X-radiation, providing a net or combined detector output correlated to the intensity of characteristic fluorescent zinc radiation of 8.6 kev. The intensity of the zinc fluorescent emission of 8.6 kev. in turn is correlated to the thickness of the zinc coating. Hence, the combined or net detector output in the fluorescence mode, that is, with the filter operative and the detectors outputs summed, is correlated to and a measure of the thickness of the zinc coating in the range of 0–1.5 ounces per square foot.

When the filter is removed and the detector outputs added, the measuring apparatus of this invention operates in a backscatter mode with the outputs of each of the detectors correlated principally to the intensity of the backscattered X-radiation, and secondarily to the intensity of the zinc characteristic fluorescent emission of 8.6 kev. Variations in the intensity of the backscattered radiation are due to variations in the thickness of the zinc coating because above a predetermined thickness of the ferrous base, which thickness in most practical cases is exceeded by the base material, the intensity of the X-radiation backscattered by the ferrous base is substantially independent of the base thickness. In addition, substantially no radiation characteristic of the ferrous fluorescent emission of 6.4 kev. reaches the detectors. This is due to the fact that zinc coating thicknesses above 1.5 ounces per square foot effectively attenuate the major part of the characteristic fluorescent ferrous emission of 6.4 kev. attempting to reach the detectors through the zinc coating. Thus, in the backscatter mode with the filter inoperative and detector outputs added, the characteristic ferrous emission of 6.4 kev. is attenuated by the zinc coating, and variations in backscattered radiation are principally due to variations in zinc coating thickness.

In the backscatter mode, the detector outputs, when added, produce a combined or net signal of relatively large magnitude which is correlated principally to the intensity of the X-radiation backscattered from the zinc coating, and hence to the thickness of the zinc coating for coatings exceeding 1.5 ounces per square foot. This net or combined output provided in the backscatter mode has a relatively high signal-to-noise ratio thereby providing reliable measurements, and, when plotted as a function of coating thickness, has appreciable slope, affording high zinc resolution.

Thus, by providing a filterable dual detector nuclear measuring gauge with a controller for selectively shifting the filter and reversing the algebraic manipulation of the detector outputs, apparatus is provided whose mode of operation can be selectively shifted between fluorescence and backscatter, providing high resolution and reliable measurements in the range below 1.5 ounces per square foot, as well as in the range above 1.5 ounces per square foot.

Figure 2:
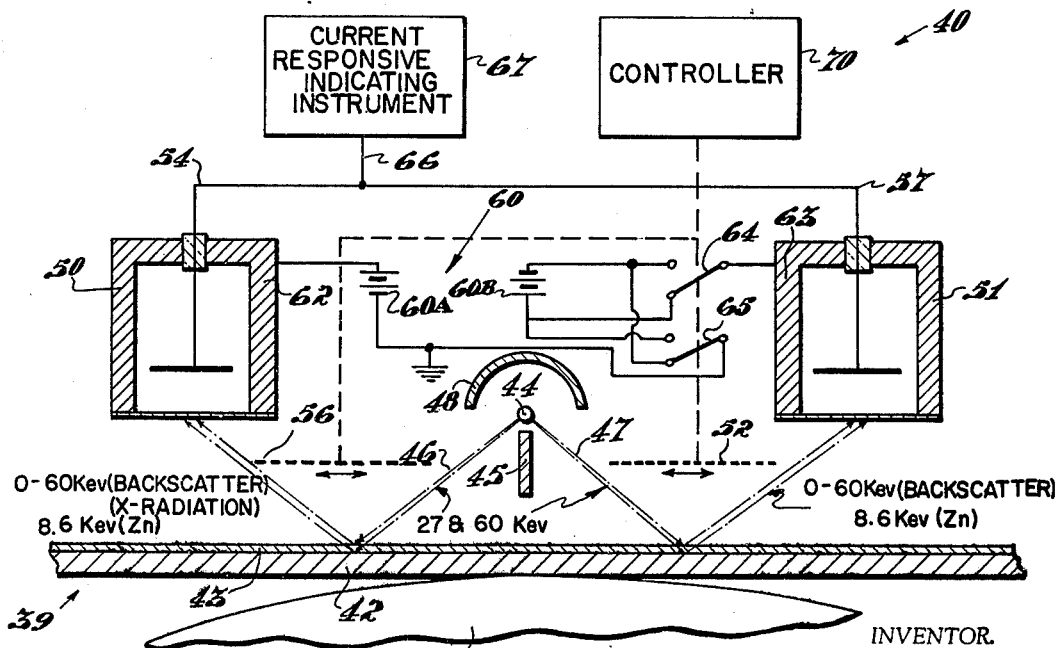

Other objectives and advantages of this invention will be more readily apparent from a detailed description of the invention taken in conjunction with the accompanying drawings in which:

FIGURE 1 depicts schematically the nuclear gauge of this invention arranged to operate in a fluorescence mode for measuring thicknesses of zinc coatings below 1.5 ounces per square foot, FIGURE 2 depicts schematically the nuclear gauge of this invention arranged to operate in a backscatter mode for measuring thicknesses of zinc coatings above 1.5 ounces per square foot, FIGURE 3 shows a plot of the combined detector output versus coating thickness for the gauge of this invention when operating in both the fluorescence and backscatter modes.

A preferred embodiment of this invention showing its various operating components arranged for operation in the two modes of which it is susceptible is depicted in FIGURES 1 and 2. Referring now to FIGURES 1 and 2, the preferred embodiment is seen to include a measuring head 40 positioned above a feed roll 41 over which travels a continuous web or sheet 39 of ferrous base material 42 having a zinc coating 43 formed thereon, the ferrous base material being in contact with the feed roll. The measuring head 40 includes a source of radiation 44 positioned above the roll 41. The source 44 predominantly emits gamma rays with energies of 27 kev. and 60 kev. Preferably a source having favorable half-life characteristics is used, for example, americium 241. Other suitable source materials may also be used if desired, such as cadmium 109. The only requirement is that the source emit radiation having an energy level above the characteristic absorption edge $K_{ab}$ of the chemical element of which the coating 43 is constituted, in this case, above 9.6 kev. corresponding to the chemical element zinc. In practice, any source emitting at 9.7 kev. or higher is suitable for use with zinc coatings.

The source 44 in conjunction with a conventional variable position beam divider 45 directs two equal intensity beams of radiation 46 and 47 toward the roll 41 for irradiating the zinc coating 43 and the ferrous base material 42. A shield 48 partially surrounding the source 44 prevents radiation from the source from being directed in a direction other than toward the roll 41. The beams of radiation 46 and 47, which principally comprise gamma radiation at 27 kev. and 60 kev., functions to excite the K alpha lines of both the zinc and ferrous material in the coating 43 and the base 42, causing the zinc and ferrous material to fluoresce, emitting their characteristic radiation of 8.6 kev. and 6.4 kev., respectively. In addition, the beams 46 and 47 product backscattered X-radiation from both the zinc coating 43 and the ferrous base 42. The backcattered X-radiation has a random energy distribution ranging from 0 kev. to 60 kev., the upper limit of 60 kev. corresponding to the highest predominant energy level emitted by the source 44.

The measuring head 40 also includes a pair of detectors 50 and 51 symmetrically positioned about the source 44 and arranged with respect to the sheet 39 such that the detectors equally receive emitted and backscattered radiation emanating from the zinc coating 43 and ferrous base 42. The detectors 50 and 51 have response characteristics which include the fluorescent radiation emitted by the zinc 43 and the ferrous base 42 of 8.6 kev. and 6.4 kev., respectively, as well as the backscattered radiation ranging from 0 kev. to 60 kev. The detectors 50 and 51 are preferably ionization chambers filled with argon gas pressurized to a level suitable for responding to radiation having the energization levels emitted and backscattered from the zinc and ferrous base material in response to irradiation from the source 44.

The detector 51 is provided with a filter 52 adapted to be selectively shifted into a filtering position (FIGURE 1) and a nonfiltering position (FIGURE 2) with respect to the detector 51 for operation in the gamma fluorescence and gamma backscatter modes, respectively, when measuring coating thicknesses below and above 1.5 ounces per square foot, respectively. The filter 52 is opaque to the characteristic fluorescent emission from the zinc coating 43 of 8.6 kev., but transmits the characteristics fluorescent radiation of the ferrous base material 42 of 6.4 kev. as well as X-radiation backscattered from both the ferrous base material and the zinc coating. Preferably, the filter 52 is constructed of nickel foil having a thickness of approximately 0.0004–0.0005 inch.

With the filter 52 in the nonfiltering position shown in FIGURE 2 characteristic of operation in the gamma backscatter mode for measuring coating thicknesses above 1.5 ounces per square foot, both of the detectors 50 and 51 are capable of receiving the characteristic fluorescent radiation emitted by the zinc coating and ferrous base material of 8.6 kev. and 6.4 kev., respectively, as well as X-radiation backscattered from the zinc coating and the ferrous base. However, for reasons to be described, no fluorescent radiation of 6.4 kev. from the ferrous base 42 reaches the detectors 50 and 51 with zinc coating thicknesses above 1.5 ounces per square foot. The detectors 50 and 51 produce output signals on lines 54 and 57, respectively, correlated to the intensity of the fluorescent emission from the zinc of 8.6 kev. as well as the backscattered radiation.

With the filter 52 in the filtering position shown in FIGURE 1 characteristic of operation in the gamma fluorescence mode for measuring zinc coatings having thicknesses below 1.5 ounces per square foot, the detector 51 receives only the characteristic fluorescent emission of the ferrous base material 42 of 6.4 kev. and the radiation backscattered from the zinc and ferrous base material, the characteristic fluorescent emission from the zinc coating 42 at 8.6 kev. being blocked. Consequently, the detector 51 produces on output line 57 a signal correlated to the intenstiy of the received 6.4 kev. radiation characteristic of the fluorescing ferrous base material and the randomly distributed backscattered X-radiation rainging from 0 kev. to 60 kev.

In the gamma fluorescence mode when the filter 52 is in its operative filtering position ideally the filter 52 attenuates only radiation energy at 8.6 kev. In practice, however, the filter 52 attenuates, to a slight extent, radiation energies at other than 8.6 kev. To compensate and correct the system, when operated in the gamma fluorescence mode, for errors introduced by the filter 52 attenuating radiation at energies other than 8.6 kev. a balancing filter 56 preferably is provided for use with the detector 50. The balancing filter 56 attenuates radiation having energies other than at 8.6 kev. to the same extent that the filter 52 attenuates radiation having energies other than at 8.6 kev. and thereby functions to balance the detectors, that is, to equalize the outputs of the detectors 50 and 51 on lines 54 and 57 when the thickness of the zinc coating is zero. The balancing filter 56 in a preferred form is fabricated of copper foil having a weight per unit area of the same order as the filter 52. When the system is operated in the gamma backscatter mode, that is, when the filter 52 is in the inoperative position with respect to the detector 51, the balancing filter 56 is removed from an operative filtering position with respect to the detector 50, the balancing function of filter 56 being unnecessary with the filter 52 removed. As those skilled in the art will appreciate, the balancing filter 56 described above with respect to the preferred embodiment, while desirable as a refinement for improving accuracy, is not essential to the proper operation of the invention.

A source of detector operating potential 60 is provided for either polarizing the detectors oppositely (FIGURE 1) for the purpose of algebraically subtracting the outputs of the detectors 50 and 51 on lines 54 and 57, respectively, when the gauge is operated in the gamma fluorescent mode to measure zinc coating thickness below 1.5 ounces per square foot, or for polarizing the detectors 50 and 51 similarly for algebraically adding their output on lines 54 and 57, respectively, when the gauge is operated in the gamma backscatter mode to measure zinc coating thicknesses above 1.5 ounces per square foot.

To oppositely polarize the detectors 50 and 51, the source of potential 60, shown schematically as including identical individual batteries 60A and 60B, is connected such that the positive and negative terminals of source 60A are directly coupled to the outer electrode 62 of the detector 50 and to ground, respectively, and the negative and positive terminals of source 60B are coupled to the outer electrode 63 of the detector 51 and ground, respectively, via the switch contacts 64 and 65, respectively, as shown in FIGURE 1. With the detectors 50 and 51 oppositely polarized, the output on lines 54 and 57 are algebraically subtracted providing a difference signal on line 66 to a current responsive indicating instrument 67, the instrument 67 being calibrated to provide a thickness indication and/or record.

The detectors 50 and 51 are similarly polarized by connecting the positive and negative terminals of the battery 60A directly to the outer electrode 62 of the detector 50 and to ground, respectively, and the positive and negative terminals of battery 60B to the ground, respectively, via switch contacts 64 and 65, respectively, as shown in FIGURE 2. With the detectors 50 and 51 similarly polarized, the outputs therefrom on lines 54 and 57 are algebraically added, providing a summation signal to the current responsive indicating instrument 67 on line 66.

A mode shifter or controller schematically indicated by the reference numeral 70 is provided. The mode shifter selectively shifts the position of the nickel filter 52 and the copper filter 56 and selectively controls the polarization of the detectors 50 and 51. Specifical'y, the mode shifter 70 functions to shift the filters 52 and 56 to the filtering position in front of the detectors 51 and 50, respectively, and transfer the switches 64 and 65 to oppositely polarize the detectors 50 and 51, as shown in FIGURE 1, when it is desired to operate the gauge in the gamma fluorescence mode to measure coating thicknesses in the range below 1.5 ounces per square foot. With the filter 52 and the switches 64 and 65 positioned as shown in FIGURE 1, the characteristic zinc fluorescent emission of 8.6 kev. is not transmitted to the detector 51 and the detector outputs on lines 54 and 57 are algebracially subtracted producing on line 66 a signal correlated to their difference.

Alternatively, the mode shifter 70 functions to shift the filters 52 and 56 and switches 64 and 65 to the position shown in FIGURE 2 to similarly polarize the detectors 50 and 51 and render the filters inoperative, when it is desired to operate the gauge in the gamma backscatter mode to measure zinc coating thickness above 1.5 ounces per square foot. With the filters 52 and 56 and the switches 64 and 65 positioned as shown in FIGURE 2, all radiation directed toward the detectors 50 and 51 is received and the detector outputs on lines 54 and 57 are algebraically added producing on line 66 an input to the current responsive indicating instrument 67 correlated to their sum.

The controller 70 may be of any suitable design capable of performing the functions outlined above, namely, shifting the position of the filters 52 and 56 and the switches 64 and 65 when changes in mode are desired. The controller 70 may for example, include a microswitch associated with a movable pointer of the current responsive indicating instrument 67 which is actuated when the pointer traverses a thickness indication of 1.5 ounces per square foot to operate a relay having switch contacts 64 and 65 and a pair of solenoids mechanically linked to the filters 52 and 56 for shifting the positions of the switches 64 and 65 and the filters 52 and 56, respectively. Specifically, when the indicating pointer goes above and below 1.5 ounces per square foot the microswitch trips, actuating the relay and solenoids to shift switches 64 and 65 and filters 52 and 56 to the position shown in FIGURES 2 and 1, respectively, changing modes between gamma backscatter and gamma fluorescence.

The measuring apparatus of this invention depicted in FIGURES 1 and 2 has two principal modes of operation, namely, a gamma fluorescence mode and a gamma backscatter mode. The gamma fluorescence mode of operation is utilized when zinc coating thicknesses below 1.5 ounces per square foot are to be measured, while the gamma backscatter mode is utilized when zinc coating thicknesses above 1.5 ounces per square foot are to be measured.

In the gamma fluorescence mode of operation, the mode shifter 70 transfers the filters 52 and 56 and the switches 64 and 65 to the position shown in FIGURE 1. With the switches 64 and 65 shifted to the position shown in FIGURE 1, the detectors 50 and 51 are oppositely polarized and their respective outputs on lines 54 and 57 are subtracted. This subtraction provides on line 66 a combined or net output signal proportional to the difference of the signals on lines 54 and 57, which is input to the current responsive indicating instrument 67, providing an indication and/or record of the measured thickness of the zinc coating 43. With the filter 52 shifted to the position shown in FIGURE 1, the characteristic fluorescent emission from the zinc coating 43 of 8.6 kev. is not transmitted to the detector 51. Consequently, the output of the detector 51 on line 57 is correlated to the intensity of X-radiation backscattered from the zinc 43 and the ferrous base 42 and the characteristic fluorescent emission of 6.4 kev. of the ferrous base material 42. The output of the detector 54 on line 54 is correlated to the intensity of X-radiation backscattered from the zinc coating 43 and the ferrous base material 42 as well as the characteristic fluorescent emission of the zinc coating 43 and the ferrous base 42 of 8.6 kev. and 6.4 kev. respectively.

When the output on line 57 of the detector 51 is subtracted from the output on line 54 of the detector 50, a net or combined output signal is provided on line 66 which is correlated to the intensity of the characteristic fluorescent emission of the zinc coating 43 of 8.6 kev. This result is produced because the component of the output on line 54 of the detector 50 attributable to the backscattered X-radiation and the characteristic fluorescent emission of the ferrous base 42 of 6.4 kev. reaching the detector 50 is effectively cancelled by the output of the detector 51 on line 57 correlated to the intensity of the backscattered radiation and the characteristic fluorescent emission of the ferrous base 42 of 6.4 kev. With cancellation of the backscattered X-radiation and characteristic fluorescent emission of the ferrous base 42 of 6.4 kev., the component of the output on line 54 of the detector 50 attributable to the characteristic fluorescent emission of the zinc coating 43 of 8.6 kev. is the sole remaining signal component input on line 66 to the current response indicating instrument 67.

A graphic representation of the operating characteristics of the measuring apparatus when arranged to operate in the gamma fluorescence mode as depicted in FIGURE 1 is shown in FIGURE 3. Specifically, solid line curve 76 depicts a plot of the combined or net detector output on line 66 versus the zinc coating thickness for coatings below 1.5 ounces per square foot. It is noted that the curve 76 has appreciable slope throughout the entire range, thereby providing good zinc resolution for zinc coating thicknesses below 1.5 ounces per square foot.

Thus, by subtracting a signal correlated to only the intensity of the fluorescent ferrous emission and the backscattered radiation from a signal correlated to the intensity of fluorescent zinc and fluorescent ferrous emissions and the backscattered radiation, a signal is produced in which the backscattered radiation and fluorescent ferrous emission components are cancelled, leaving only the signal component correlated to the intensity of the fluorescent zinc emission and, hence, to the thickness of the zinc coating. This resultant difference signal, when input to the instrument 67, provides an indication and/or record of the thickness of the zinc coating 43.

Operation of the preferred embodiment in the gamma backscatter mode for measuring zinc coating thickness exceeding 1.5 ounces per square foot is produced by shifting the filters 52 and 56 and the switches 64 and 65 to the positions shown in FIGURE 2. With the filter 52 in nonfiltering relationship with respect to the detector 51, all radiation directed toward the detector 51 is received as is all the radiation directed toward the detector 50. It is important to consider at this point the nature of the radiation which is directed to the detector 51 in response to irradiation of the zinc coating 43 and ferrous base material 42 by the source 44.

Specifically, irradiation of the zinc coating 43 and the ferrous base material 42 causes both the zinc coating 43 and the ferrous base material 42 to fluoresce, emitting energy at levels of 8.6 kev. and 6.4 kev., respectively. In addition, X-radiation is backscattered from both the zinc and the ferrous base having energies ranging from 0 kev. to 60 kev. The fluorescent emission of the zinc coating 43 of 8.6 kev. is directed toward and transmitted to the detectors 50 and 51, the filter 52 not being interposed between the zinc coating 43 and the detector 51. However, the characteristic fluorescent emission from the ferrous base 42 of 6.4 kev., while being directed to the detectors 50 and 51, is not transmitted due to the presence of the zinc coating 43 interposed between the ferrous base material 42 and the detectors. With zinc coating thicknesses in excess of 1.5 ounces per square foot substantial attenuation of the characteristic fluorescent emission of 6.4 kev. from the ferrous base occurs as the charateristic fluorescent emission of the ferrous base travels through the zinc coating 43 toward the detectors. Consequently, substantially none of the characteristic fluorescent emission of 6.4 kev. from the ferrous base material reaches the detectors. The X-radiation backscattered from the zinc coating 43 ranging in energy from 0 kev. to 60 kev. reaches the detectors, as does the X-radiation backscattered from the ferrous base 42, except for that having low energy which is attenuated by the zinc layer 43.

Summarizing, with the filter 52 in the position shown in FIGURE 2 and the thickness of the zinc coating 43 exceeding 1.5 ounces per square foot, the only radiation reaching the detectors as a consequence of irradiation of zinc and ferrous material by the source 44 is the characteristic fluorescent zinc emission of 8.6 kev. and the X-radiation backscattered from both the zinc coating 43 and the ferrous base 42 having energies ranging from approximately 0 kev. to 60 kev.

The intensity of both the characteristic fluorescent radiation of the zinc of 8.6 kev. and the X-radiation backscattered from the zinc coating 43 is correlated to the thickness of the zinc coating. The intensity of the radiation backscattered from the ferrous base 42 is substantially independent of the thickness of the ferrous base for ferrous base thicknesses above a certain minimum thickness. Since, in practice, the thickness of the ferrous base 42 exceeds this predetermined minimum, the X-radiation backscattered from the ferrous base 42 is substantially constant and, therefore, independent of the thickness of the ferrous base 42. With the X-radiation backscattered from the ferrous base 42 substantially constant, variations in the intensity of the backscattered X-radiation reaching the detectors 50 and 51, assuming a constant source 44 intensity, are attributable solely to variations in the intensity of the X-radiation backscattered from the zinc coating 43. Consequently, variations in the output signals on lines 54 and 57 from the detectors 50 and 51 are substantially attributable solely to variations in the thickness of the zinc coating 43.

The intensity of the beams 46 and 47 irradiating the sheet 39 are substantially identical. Thus, the total radiation reaching each of the detectors 50 and 51 is likewise substantially identical, the identity being with respect to both the compositions of the radiation from an energy level standpoint as well as the respective intensities of the various radiation components. Consequently, variations in each of the outputs of the detectors 50 and 51 on lines 54 and 57, respectively, which are attributable to variations in thickness of the zinc coating 43, are identical.

With variations in the outputs of the detectors 50 and 51 on lines 54 and 57, respectively, identical and substantially correlated to the thickness of the zinc coating 43 and with the detectors 50 and 51 similarly polarized by the connection of the switches 64 and 65 as shown in FIGURE 2, a summation signal on input line 66 to the current responsive indicating instrument 67 of large magnitude is provided. Variations in the level of this signal are substantially solely attributable to variations in the thickness of the zinc coating 43.

The operational characteristics of the apparatus of this invention in the gamma backscatter mode for measuring thicknesses above 1.5 ounces per square foot is depicted by the curve 77 of FIGURE 3. Curve 77 is a plot of the combined or net detector output on line 66 versus the thickness of the zinc coating for thicknesses over 1.5 ounces per square foot.

The advantages inherent in the operation of the gauge of this invention, which are attributable to the capability of switching the operational mode, are best understood by comparing solid line curve 77 and dotted line 78. Solid line 77 characterizes the measurement of coating thicknesses above 1.5 ounces per square foot in the gamma backscatter mode, while the dotted line curve 78 characterizes the measurement of coating thicknesses above 1.5 ounces per square foot in the gamma fluorescence mode. Now referring to FIGURE 3 it is noted that the slope of curve 77 is substantially larger than the slope of curve 78. This increased slope, for thicknesses above 1.5 ounces per square foot, which is attributable to the capability of switching to a gamma backscatter mode, markedly enhances the zinc resolution throughout this range.

In addition, it will be noted by referring to FIGURE 3 and comparing curves 78 and 77 that curve 77 characterizing operation in the gamma backscatter mode as a signal strength or magnitude which is approximately 800% greater than that of curve 78 characterizing operation in the gamma fluorcescence mode for measuring thickness exceeding 1.5 ounces per square foot. This greatly increased signal strength, which is attributable to the capability of operating in the gamma backscatter mode when measuring thickness in excess of 1.5 ounces per square foot, provides a very high signal-to-noise ratio of the combined detector output on input line 66 to the current responsive indicating instrument 67. This greatly enhanced signal-to-noise ratio provides a very high degree of reliability in the thickness measurement.

Thus, it is apparent that the measuring apparatus of this invention, having operating characteristics described by the curves 77 and 78 of FIGURE 3, has the capability of measuring zinc coating thicknesses over an extended range including thicknesses both below and above 1.5 ounces per square foot. Further, it is apparent that the improved measuring capability, namely, high zinc resolution and enhanced signal-to-noise ratio, particularly when measuring thickness exceeding 1.5 ounces per square foot, has been accomplished in a very simple manner. Specifically, the significantly improved operating characteristics of the measuring apparatus of this invention have been accomplished by merely shifting the nickel filter 52 position and altering the algebraic manipulation of the detector outputs. These small changes, however, completely change the mode of operation of the measuring apparatus.

Specifically, the shifting of the filter 52 and reversing of the algebraic manipulation of the detector outputs 54 and 57 enables the mode of operation of the measuring apparatus to be changed between the gamma fluorescence mode particularly adapted to measure thicknesses below 1.5 ounces per square foot and the gamma backscatter mode particularly adaptable to provide accurate measurements of thickness in excess of 1.5 ounces per square foot. Thus, a gauge is provided having the capability of measuring zinc coating thickness with high zinc resolution and reliability over a wide range.

As those skilled in the art will appreciate, apparatus constructed in accordance with the principles of this invention may be used to measure thicknesses of coatings other than zinc. For example, it is possible to measure the thickness of coatings or layers of tin formed on base materials using the disclosed apparatus modified only to the extent of providing, instead of the nickel filter 52 which is opaque to the characteristic fluorescent emission of the zinc coating, a filter which is opaque to the characteristic fluorescent emission of tin of 25 kev. By substituting for the nickel filter 52 of the disclosed apparatus a filter which is opaque to the characteristic fluorescent emission of tin of 25 kev., measuring apparatus is provided which can, by merely switching modes between a gamma fluorescence and gamma backscatter, provide accurate measurements, over a wide range, of the thickness of a tin coating formed on a base material. In a similar manner, coatings other than tin and zinc may be measured by making appropriate changes in the filter 52.

I claim:

1. Apparatus for measuring over an extended range the thickness of a layer formed on a base in which said layer and base exhibit first and second different characteristic energy radiation emission levels, respectively, and random energy level radiation when subjected to radiation at a specified energy level equal to or exceeding the highest of said first and second levels, and in which the thickness of said layer beyond a predetermined thickness substantially attenuates the passage of radiation at said second energy level, said apparatus comprising:

a radiation source for irradiating said layer and base with energy of said specified level, first and second radiation detectors each responsive to said first, second, and random radiation energy levels, said detectors being positioned to receive radiation emanting from said layer and base in response to irradiation from said energy source, a radiation filter selectively positionable in filtering and nonfiltering relationship with said first detector for transmitting and blocking, respectively, said first characteristic energy radiation, and a controller for alternately shifting said filter into said filtering relationship and causing subtraction of the outputs of said detectors when measuring layers having thicknesses less than said predetermined thickness thereby producing a net detector output correlated to substantially only the intensity of radiation at said first energy level and therefore to the thickness of said layer, and shifting said filter into said nonfiltering relationship and causing addition of the output of said detectors when measuring layers having thicknesses greater than said predetermined thickness, thereby producing a net detector output correlated to the intensity of said random energy level radiation and therefore to said thickness of said layer, whereby the thickness of said layer over a range of thicknesses extending above and below said predetermined thickness is measurable by shifting said filter and reversing the algebraic manipulation of said detector outputs.

2. The apparatus of claim 1 wherein said radiation source activates said layer and base to fluoresce at said first and second radiation energy levels, respectively, and to produce backscattered radiation, and wherein the sum of said detector outputs with said filter in said nonfiltering position is correlated to the intensity of said backscattered radiation, and the difference of said detector output with said filter in said filtering position is correlated to the intensity of said flourescent radiation emitted by said layer, whereby the combined detector output for layer thicknesses above and below said predetermined thickness is correlated to said layer thickness and is substantially independent of said base thickness.

3. The apparatus of claim 2 wherein said specified energy level of said source exceeds 9.6 kev., wherein said first and second energy levels are 8.6 kev. and 6.4 kev., respectively, and wherein said filter attenuates 6.4 kev. radiation, whereby said apparatus is particularly adaptable for measuring the thickness of zinc layers formed on ferrous bases.

4. The apparatus of claim 3 wherein said source is americium 241, said filter comprises nickel, and said backscattered radiation includes X-rays having random energy levels between 0 kev. and 60 kev.

5. Apparatus for measuring the thickness of a layer formed on a base comprising:
   a source of radiation positioned adjacent said layer and arranged for irradiating and exciting said layer and base to fluoresce at first and second different characteristic energy levels, respectively, and producing random energy backscattered X-radiation,
   first and second ionization chambers each responsive to said first, second and random energy level radiation, said detectors being positioned adjacent said layer and substantially equidistant from said source for receiving radiation emanating from said layer and base,
   a filter selectively positionable in filtering and nonfiltering relationship with said first ionization chamber, said filter being opaque to fluorescent radiation emitted by said layer, and
   circuit means electrically combining the outputs of, and applying operation potentials to, said ionization chambers, and
   a controller for positioning said filter into said filtering position and oppositely polarizing said ionzaton chambers for measurng layers having thicknesses which do not substantially attenuate said fluorescent radiation emitted by said base, and for positioning said filter into said nonfiltering position and simlarly polarizing said ionization chambers for measuring layers having thicknesses which substantially attenuate said fluorescent radiation emitted by said base, whereby coatings having thicknesses above and below said attenuating level are measurable by shifting the position of said filter and reversing the polarity said ionization chambers.

6. The apparatus of claim 5 wherein said source emits radiation exceeding 9.6 kev., wherein said fluoroescence of said layer and base is at 8.6 kev. and 6.4 kev., respectively, characterizing zinc layers and ferrous bases, respectively, and wherein said filter is opaque to 6.4 kev. radiation.

7. The apparatus of claim 6 wherein said source is americium 241, said filter is nickel, and said backscattered radiation includes X-rays having random energy levels between 0 kev. and 60 kev.

8. Apparatus for measuring over an extended range the thickness of a layer formed on a base in which said layer and base exhibit first and second different characteristic energy radiation emission levels, respectively, and random energy level radiation when subjected to radiation at a specified energy level equal to or exceeding the highest of said first and second levels, and in which the thickness of said layer beyond a predetermined thickness substantially attenuates the passage of radiation at said second energy level, said apparatus comprising:
   a radiation source for irradiating said layer and base with energy of said specified level,
   radiation detection means responsive to said radiation levels,
   selectively operable radiation filtering means associated with said detector means, said filter means being opaque to said first characteristic energy radiation and providing a first detector output when operative, and a second detector output when inoperative, said first detector and second detector outputs being correlated to the intensities of said first characteristic energy radiation and said backscattered radiation, respectively, and
   a controller for rendering said filter operative and inoperative when measuring layers of thickness less than and more than said predetermined thickness, respectively, thereby shifting the operation of said apparatus between fluorescence and backscatter, modes respectively, accurate over thickness ranges below and above said predetermined thickness, respectively.

References Cited
UNITED STATES PATENTS 2,964,633  12/1960  Bernstein.
2,967,934   1/1961  Martinelli.

RALPH G. NILSON, Primary Examiner

M. J. FROME, Assistant Examiner

U.S. Cl. X.R.
250—51.5, 71